United States Patent
Sainis et al.

(10) Patent No.: US 12,298,647 B2
(45) Date of Patent: May 13, 2025

(54) PRESSURE-SENSITIVE WRITING MEDIA COMPRISING ELECTROPHORETIC MATERIALS

(71) Applicant: E INK CORPORATION, Billerica, MA (US)

(72) Inventors: Sunil Krishna Sainis, Melrose, MA (US); Seth J. Bishop, Framingham, MA (US); Kosta Ladavac, Somerville, MA (US); Stephen J. Telfer, Arlington, MA (US); Richard J. Paolini, Jr., Framingham, MA (US)

(73) Assignee: E Ink Corporation, Billerica, MA (US)

( * ) Notice: Subject to any disclaimer, the term of this patent is extended or adjusted under 35 U.S.C. 154(b) by 19 days.

(21) Appl. No.: 18/374,083

(22) Filed: Sep. 28, 2023

(65) Prior Publication Data

US 2024/0019753 A1     Jan. 18, 2024

Related U.S. Application Data

(62) Division of application No. 17/500,209, filed on Oct. 13, 2021, now Pat. No. 11,809,057, which is a
(Continued)

(51) Int. Cl.
   *G02F 1/1685* (2019.01)
   *G02F 1/01* (2006.01)
   *G02F 1/167* (2019.01)

(52) U.S. Cl.
   CPC .......... *G02F 1/1685* (2019.01); *G02F 1/0128* (2013.01); *G02F 1/167* (2013.01)

(58) Field of Classification Search
   CPC .. G02F 1/167; G02F 1/16757; G02F 1/16762; G02F 1/1676; G02F 1/1685;
   (Continued)

(56) References Cited

U.S. PATENT DOCUMENTS

| 4,418,346 A | 11/1983 | Batchelder |
| 5,872,552 A | 2/1999 | Gordon, II et al. |

(Continued)

FOREIGN PATENT DOCUMENTS

| JP | 84878889 A | 10/1973 |
| JP | H10301510 A | 11/1998 |

(Continued)

OTHER PUBLICATIONS

Braganza, Clinton et al., "eWriter with Select Erase Functionality", SID Symposium Digest of Technical Papers, vol. 48, No. 1, pp. 539-541 (May 2017).

(Continued)

*Primary Examiner* — Brandi N Thomas
(74) *Attorney, Agent, or Firm* — Ioannis Constantinides

(57) ABSTRACT

Systems and methods are disclosed for pressure-sensitive, electrophoretic displays, which may optionally include haptic feedback. A display may comprise a first conductive layer having a pressure-sensitive conductivity and an electrophoretic layer positioned adjacent to the first conductive layer, wherein the electrophoretic layer is in electrical communication with the first conductive layer and is configured to locally change state based on a pressure applied to the first conductive layer. Local and global writing and erasing of the display can also be achieved.

12 Claims, 9 Drawing Sheets

Related U.S. Application Data division of application No. 16/680,950, filed on Nov. 12, 2019, now Pat. No. 11,249,367.

(60) Provisional application No. 62/773,891, filed on Nov. 30, 2018.

(58) Field of Classification Search
CPC .. G02F 1/0128; G09G 3/344; G09G 2300/08; G01N 27/447; G01N 27/30
See application file for complete search history.

(56) References Cited

U.S. PATENT DOCUMENTS

| | | | |
|---|---|---|---|
| 5,972,493 | A | 10/1999 | Iwasaki et al. |
| 6,130,774 | A | 10/2000 | Albert et al. |
| 6,144,361 | A | 11/2000 | Gordon, II et al. |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,473,072 | B1 | 10/2002 | Comiskey et al. |
| 6,672,921 | B1 | 1/2004 | Liang et al. |
| 6,704,133 | B2 | 3/2004 | Gates et al. |
| 6,788,449 | B2 | 9/2004 | Liang et al. |
| 6,866,760 | B2 | 3/2005 | Paolini, Jr. et al. |
| 6,914,713 | B2 | 7/2005 | Chung et al. |
| 6,922,276 | B2 | 7/2005 | Zhang et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,170,670 | B2 | 1/2007 | Webber |
| 7,312,784 | B2 | 12/2007 | Baucom et al. |
| 7,339,715 | B2 | 3/2008 | Webber et al. |
| 7,408,699 | B2 | 8/2008 | Wang et al. |
| 7,411,719 | B2 | 8/2008 | Paolini, Jr. et al. |
| 7,453,445 | B2 | 11/2008 | Amundson |
| 7,535,624 | B2 | 5/2009 | Amundson et al. |
| 7,679,814 | B2 | 3/2010 | Paolini, Jr. et al. |
| 7,715,088 | B2 | 5/2010 | Liang et al. |
| 7,839,564 | B2 | 11/2010 | Whitesides et al. |
| 8,009,348 | B2 | 8/2011 | Zehner et al. |
| 8,139,039 | B2 | 3/2012 | Schneider et al. |
| 8,179,590 | B1 | 5/2012 | Mabeck et al. |
| 9,025,238 | B2 | 5/2015 | Chan et al. |
| 9,279,906 | B2 | 3/2016 | Kang |
| 10,444,553 | B2 | 10/2019 | Laxton |
| 2005/0280634 | A1 | 12/2005 | Tanabe et al. |
| 2011/0310465 | A1 | 12/2011 | Takanashi et al. |
| 2013/0044048 | A1 | 2/2013 | Joo et al. |
| 2013/0063333 | A1 | 3/2013 | Arango et al. |
| 2013/0155059 | A1 | 6/2013 | Wang et al. |
| 2015/0005720 | A1 | 1/2015 | Zang et al. |
| 2015/0355522 | A1* | 12/2015 | Lee .................... G02F 1/167 359/296 |
| 2016/0012710 | A1 | 1/2016 | Lu et al. |

FOREIGN PATENT DOCUMENTS

| | | |
|---|---|---|
| JP | 2002014379 A | 1/2002 |
| JP | 2002014380 A | 1/2002 |
| JP | 2002312124 A | 10/2002 |
| JP | 2007316248 A | 12/2007 |
| JP | 2008070440 A | 3/2008 |
| JP | 2017026695 A | 7/2015 |

OTHER PUBLICATIONS

Korean Intellectual Property Office, PCT/US2019/060877, International Search Report and Written Opinion, Apr. 9, 2020.

\* cited by examiner

PRESSURE-SENSITIVE WRITING MEDIA COMPRISING ELECTROPHORETIC MATERIALS

CROSS-REFERENCE TO RELATED APPLICATIONS

This application is a divisional application and claims the benefit of copending application Ser. No. 17/500,209 filed on Oct. 13, 2021 (Publication No. 2022/0066277), which itself is a divisional of application Ser. No. 16/680,950 filed on Nov. 12, 2019 (Publication No. 2020/0174336), which claims priority to U.S. Provisional Application No. 62/773,891, filed Nov. 30, 2018, which is incorporated herein by reference in its entirety.

All patents, patent applications, and publications referred to in this document are incorporated by reference in their entireties.

BACKGROUND OF THE INVENTION

This invention relates to electro-optic displays. More specifically, this invention relates to systems and methods for pressure-sensitive electrophoretic displays or pressure-sensitive magnetoelectrophoretic displays. In some embodiments, the displays include haptic feedback. The described displays can be manufactured inexpensively and can be used for writing and drawing, or they may be incorporated into surfaces, touch panels, etc.

Haptic feedback is increasingly used in the electronic device industry. Most of these feedback schemes rely on sensing the force applied in some context and then relaying that force to the user via actuators, such as piezoelectric, acoustic etc. Passive haptic feedback mechanisms are also known in the art. These mechanisms require no additional control circuitry or additional mechanical relays. Any system with a spring or stiffness is an excellent example of this idea. As the spring is compressed/extended, the restoring force, which is exerted by the spring to the surface it is attached to, grows. As long as the user compressing/extending the spring is paying attention, the stiffness of the spring provides haptic feedback.

Recently, passive haptic feedback has been incorporated into various displays in order to provide increased feedback and control to the user of the display. Such passive haptic feedback is often incorporated into interfaces that allow users to write on the display and produce a change in the state of the display. For example, touch panel displays on appliances may include both optical and tactile feedback to indicate that a button or function has been activated. Such dual feedback systems are especially important in home appliances because there is such a variety in visual and auditory health among the users. For example, a visually impaired user needs the haptic feedback to know that she has successfully programmed the microwave.

As used herein, "display" includes both visual displays in which the output image is rendered using a pixelated backplane (typically addressed as either an active or a passive matrix) as well as those in which the entire module is a single "pixel". In the former instance, writing on a display may include a stylus that interacts with a digitizer combined with active reproduction of the strokes by mapping the digitized stylus motions to the pixels of the display. Alternatively, especially in the latter single pixel displays, a writing implement may directly interact with the medium, causing some physical change that manifests directly as a local change in the optical property. This direct interaction is sometimes described as direct writing.

Displays of the latter category include the Fisher Price MAGNA DOODLE and that Kent Displays BOOGIE BOARD. In the instance of the MAGNA DOODLE, a magnetic stylus pulls magnetic particles to a viewing surface, thereby showing as writing. In the BOOGIE BOARD, a local change in pressure (caused by writing with a hard-plastic stylus tip) gives rise to a change in the state of a cholesteric liquid crystalline material that leads to scattering of light above a black background. In the BOOGIE BOARD, the applied image can be erased by application of an electric field across the whole display. When this is done, the entire display reverts to a dark state; thus, this kind of an erasing procedure is referred to as "global" erasing. However, in the currently available BOOGIE BOARD products, it is not possible to "locally" erase the writing; that is, the user can erase the whole writing or drawing, but not only part of it.

In view of the above, a display that is capable of both local and global writing and erasing using a true change in state would provide an improved, natural writing experience to a user. If this writing functionality were additionally available with haptic feedback, the experience would be further improved.

SUMMARY OF THE INVENTION

In view of the above, there exists a need for displays that can provide novel passive haptic feedback configurations and local and global erasing between multiple states. The present disclosure seeks to expand upon previous electrophoretic display technology by providing systems and methods relating to pressure-sensitive electrophoretic displays with passive haptic feedback. In some aspects, the systems and methods of the present disclosure provide the ability for the electrophoretic display to change state both locally and globally. Unlike the prior art, this change of state may be from a first state to a second state or the reverse. Because writing in either modality is possible, writing and erasing may be achieved more naturally.

In one aspect, the present disclosure provides a pressure-sensitive, electrophoretic display. The display can comprise a first conductive layer having a pressure-sensitive conductivity (e.g., comprising a piezoresistive material) and an electrophoretic layer positioned adjacent to the first conductive layer, wherein the electrophoretic layer is in electrical communication with the first conductive layer and is configured to locally change state based on a pressure applied to the first conductive layer In another aspect, the present disclosure provides a pressure-sensitive, electrophoretic display. The display can comprise a first electrode layer and a second electrode layer, wherein the first electrode and the second electrode are configured to provide an electric potential difference upon application of a voltage across the first electrode and second electrode. The display can also comprise an electrophoretic layer, wherein the electrophoretic layer is positioned between the first electrode and the second electrode. The display can additionally include a dielectric fluid layer, wherein the dielectric fluid layer is positioned between the first electrode and the electrophoretic material. Applying a pressure to a location on the pressure-sensitive, electrophoretic display causes a displacement of at least a part of the dielectric fluid layer, thereby causing a change in electric field experienced by a portion of the electrophoretic layer located at the location, thereby causing a local change of state in the electrophoretic layer.

In one aspect, the present disclosure provides a pressure-sensitive, electrophoretic display. The display can comprise a magnetic layer configured to produce a magnetic field, and an electrophoretic layer, comprising an electrically- and magnetically-addressable ink medium configured to locally change state based on an applied pressure. The display can also comprise a deformable layer located between the magnetic layer and the electrophoretic layer, wherein applying a pressure to a location on the pressure-sensitive, electrophoretic display causes a displacement of at least a part of the deformable layer, thereby causing a change in the magnetic field experienced by a portion of the electrophoretic layer at the location. The change in the magnetic field causes a local change of state in the electrophoretic layer.

In another aspect, the present disclosure provides a method for using any of the pressure-sensitive electrophoretic displays described herein. The method can comprise a step of creating a region of increased pressure by contacting the display, wherein the region of increased pressure produces a local change in a state of the display, and a step of producing a global change in a state of the display. One of the steps may comprise changing an electric field or a magnetic field applied to an electrophoretic layer. The local change in a state of the display may be a local erasure of the previous change in state of the display.

DETAILED DESCRIPTION OF THE INVENTION

Figure 1A:
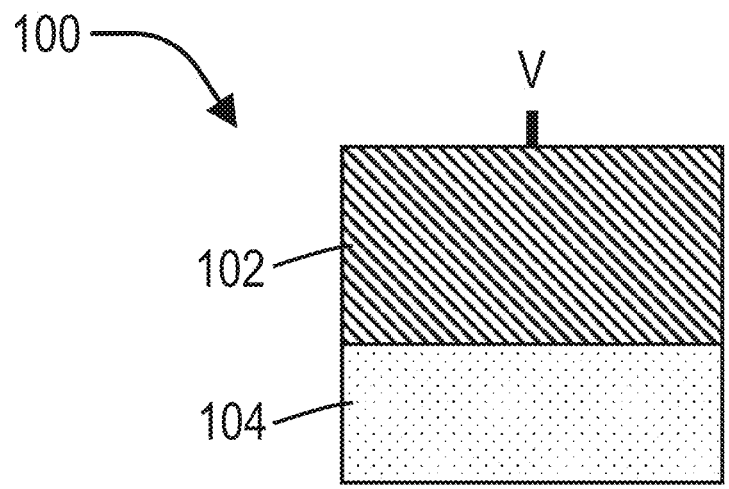
FIG. 1A is an exemplary illustration of a pressure-sensitive electrophoretic display construction with a conductive layer in an uncompressed state.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays, also referred to as electrophoretic displays, can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation describe various technologies used in encapsulated electrophoretic and other electro-optic media. Encapsulated electrophoretic media comprise numerous small capsules, each of which itself comprises an internal phase containing electrophoretically mobile particles in a fluid medium, and a capsule wall surrounding the internal phase. Typically, the capsules are themselves held within a polymeric binder to form a coherent layer positioned between two electrodes. Alternatively, in a microcell electrophoretic display, the charged particles and the fluid are not encapsulated within microcapsules but instead are retained within a plurality of cavities formed within a carrier medium, typically a polymeric film. The term "microcavity electrophoretic display" may be used to cover both encapsulated and microcell electrophoretic displays. The technologies described in the these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Microcell structures, wall materials, and methods of forming microcells, see for example U.S. Pat. Nos. 7,072,095; and 9,279,906;
(d) Methods for filling and sealing microcells, see for example U.S. Pat. Nos. 7,144,942; and 7,715,088;
(e) Films and sub-assemblies containing electro-optic materials; see for example U.S. Pat. Nos. 6,982,178; and 7,839,564;
(f) Backplanes, adhesive layers and other auxiliary layers and methods used in displays; see for example U.S. Pat. Nos. 7,116,318, and 7,535,624;
(g) Color formation and color adjustment; see for example U.S. Pat. Nos. 7,075,502; and 7,839,564;
(h) Methods for driving displays; see for example U.S. Pat. Nos. 7,012,600; and 7,453,445;
(i) Applications of displays; see for example U.S. Pat. Nos. 7,312,784; and 8,009,348;
(j) Non-electrophoretic displays, as described in U.S. Pat. No. 6,241,921; and U.S. Patent Application Publication Nos. 2015/0277160; 2015/0005720; and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet. Accordingly, for purposes of the present application, such polymer-dispersed electrophoretic media are regarded as sub-species of encapsulated electrophoretic media.

The term "impulse" is used herein in its conventional meaning of the integral of voltage with respect to time. However, some bistable electro-optic media act as charge transducers. With such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to SiPix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552, 6,130,774, 6,144,361, 6,172,798, 6,271,823, 6,225,971, and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface. Other types of electro-optic media may also be used in the displays of the present invention.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes, an electrophoretic layer, and a photoconductive layer between the electrodes. Because the photoconductive material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoconductive material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used herein to mean that the layer thus designated transmits sufficient light to enable an observer looking through that layer, to observe the change in display states of the electro-optic medium, which will normally be viewed through the electrically-conductive layer and adjacent substrate, if present. In cases where the electro-optic medium displays a change in reflectivity at non-visible wavelengths, the term "light-transmissive" should be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

Many types of electro-optic media are essentially monochrome, in the sense that any given medium has two extreme optical states and a range of gray levels lying between the two extreme optical states. However, there is today an increasing demand for full color displays, even for small, portable displays; for example, most displays on cellular telephones are today full color. To provide a full color display using monochrome media, it is either necessary to place a color filter array, where the display can be viewed through the color filter array, or to place areas of different electro-optic media capable of displaying different colors adjacent one another.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode; the layer on the opposed side of the electrophoretic layer is typically a protective layer intended to prevent the movable electrode damaging the electrophoretic layer.

An encapsulated electrophoretic medium typically comprises electrophoretic capsules disposed in a polymeric binder, which serves to form the discrete capsules into a coherent layer. The continuous phase in a polymer-dispersed electrophoretic medium and the cell walls of a microcell medium serve similar functions. It has been found by E Ink researchers that the specific material used as the binder in an electrophoretic medium can affect the electro-optic properties of the medium. Among the electro-optic properties of an electrophoretic medium affected by the choice of binder is the so-called "dwell time dependence". It has been found that, at least in some cases, the impulse necessary for a transition between two specific optical states of a bistable electrophoretic display varies with the residence time of a pixel in its initial optical state, and this phenomenon is referred to as "dwell time dependence" or "DTD". Obviously, it is desirable to keep DTD as small as possible, because DTD may affect the difficulty of driving the display and the quality of the produced image; for example, DTD may cause pixels, which are supposed to form an area of uniform gray color, to differ slightly from one another in gray level; this may be a problem, because the human eye is very sensitive to such variations. Although it has been known that the choice of binder affects DTD, choosing an appropriate binder for any specific electrophoretic medium has hitherto been based on trial-and-error, with essentially no understanding of the relationship between DTD and the chemical nature of the binder.

As used herein, "passive haptic feedback" may be considered feedback that recreates the sense of touch by applying forces to the user and it accomplishes this without the use of additional control circuitry or additional mechanical relays. This haptic feedback may provide a varying level of force that is experienced by the user.

As used herein, the terms "local writing" and "local erasing" refers to change in states that occur only within a specific region of the pressure-sensitive display. Often times this region may overlap with and result from a region that has a pressure applied to it. Whether or not the local change in state is considered writing or erasing is often dependent on the intent of the user and the situational context.

As used herein, the terms "global writing" and "global erasing" refers to change in states that occurs within a large region or all of the pressure-sensitive display. Often times global erasing may result from a change in the electric or magnetic field experienced by the entire electrophoretic layer. Whether or not the global change in state is considered writing or erasing is often dependent on the intent of the user and the situational context.

Although the pressure-sensitive display systems and methods of the present disclosure are frequently construed as being used in e-writers, one of skill in the art will appreciate that the teachings disclosed herein can be applied to numerous situations that require both optical and haptic feedback.

Unless context dictates otherwise, the electrophoretic layer of the pressure-sensitive displays described herein may be comprise any of the constructions described above. The electrophoretic layer may comprise a microcell electrophoretic display construction. The electrophoretic layer may comprise an encapsulated electrophoretic display construction. The electrophoretic layer may comprise a first group of particles with electrophoretic mobility and a second group of particles with electrophoretic mobility, wherein the first group of particles has a different color and the second group of particles. The electrophoretic layer may also comprise a third group of particles with electrophoretic mobility that has a different color than that of the first group and the second group.

The particles of the electrophoretic medium typically include one or more pigment types. The pigment may be both electrically- and magnetically-controllable, i.e., magnetoelectrophoretic. In a multi-pigment display, only of the pigment types may be both electrically- and magnetically-controllable. An example of a multi-pigment display is a display including white pigment particles and black pigment particles. The black pigment particles may be both electrically- and magnetically-controllable, as an example. Commercially available magnetic particles, such as Bayferrox 8600, 8610; Northern Pigments 604, 608; Magnox 104, TMB-100; Columbian Mapico Black; Pfizer CX6368, and CB5600 and the like, may be used alone or in combination with other pigments to create pigments that are both electrically- and magnetically-controllable. The white pigment may be, for example, titanium dioxide.

The pigments may be surface-functionalized with polymer to control the charge and steric properties of the pigments. Additionally, a charge control agent is typically included in the electrophoretic medium to achieve the desired zeta potential for the pigment type. Thus, for example, the electrophoretic medium of the present invention will typically comprise at least one charge control agent to control the charge on the various particles. The electrophoretic fluid may have dissolved or dispersed therein a polymer having a number average molecular weight in excess of about 20,000 and being essentially non-absorbing on the particles to improves the bistability of the display, e.g., as described in U.S. Pat. No. 7,170,670.

In one aspect, the present disclosure provides a pressure-sensitive, electrophoretic display. The display may comprise a first conductive layer having a pressure-sensitive conductivity, and an electrophoretic layer positioned adjacent to the first conductive layer, wherein the electrophoretic layer is in electrical communication with the first conductive layer and is configured to locally change state based on a pressure applied to the first conductive layer.

The conductivity of the first conductive layer may change when subjected to the applied pressure and a resulting volume change. For example, the first conductive layer may become more conductive during compression. The first conductive layer may be configured to provide a restoring force, wherein the restoring force acts to return the first conductive layer back to an initial state. This restoring force may provide passive haptic feedback to any user of the display and as a result of the mechanical properties of the first conductive layer. In this manner, any user of the display may experience both optical and haptic feedback.

As described below, it is understood that the "conductive layer" in the pressure-sensitive displays has a conductivity that changes with, for example, deformation or compression. For example, a piezoresistive material, such as doped germanium can be used as a pressure-sensitive conductor. Alternatively, polymers with oriented conductive particles may be used. As the shape or density of the polymer is changed, e.g., because of deformation or pressure, the conductivity of the material changes. The polymer may be polyethylene or polyester and the oriented conductive particles may be carbon nanotubes or metal whiskers. Alternatively, specially engineered materials, such as vertically oriented conductive block copolymer films can be used. See, e.g., Singh et al., "Large-Scale Roll-to-Roll Fabrication of Vertically Oriented Block Copolymer Thin Films," *ACS Nano,* 2013, 7 (6), pp 5291-5299.

In the instance of a pressure-sensitive, electrophoretic display, when the first conductive layer undergoes compression, the compressed layer may better conduct an applied electrical charge, which can produce a resulting change in state of the electrophoretic layer. The electrically connected source of the applied charge may be any commonly known in the art, such as a battery or voltage supply. The change in state of the electrophoretic layer may be a distinct change from a first state to one or more additional states. For example, from white to black. Alternatively, the change may occur gradually between two or more states. For example, from a first state that gradually changes color, reflectance, lightness, or other optical property based on the magnitude of the pressure applied and the subsequent compression of the conductive layer.

Figure 1B:
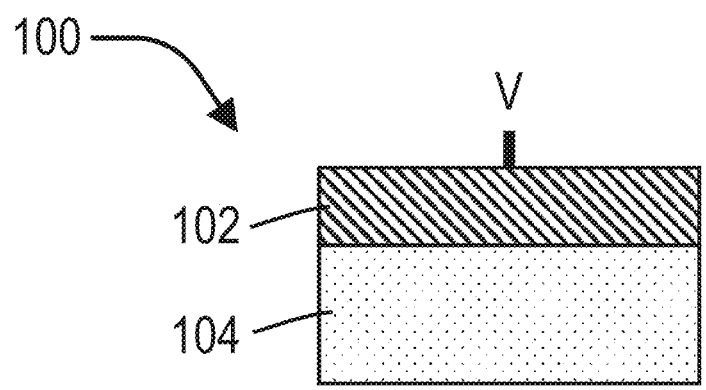
FIG. 1B is an exemplary illustration of a pressure-sensitive electrophoretic display construction with a conductive layer in a compressed state.

FIG. 1A depicts a pressure-sensitive, electrophoretic display 100 with a first conductive layer 102 and an electrophoretic layer 104. The first conductive layer is depicted in an uncompressed state. In this depiction, the first conductive layer and the electrophoretic layer can effectively be considered as being electrically connected in series. FIG. 1B depicts the same display 100 at a later time when the first conductive layer 102 has undergone compression. Such compression allows for sufficient current flow through the first conductive layer 102 to produce a change in state of the electrophoretic imaging device 104. This change in state of the display, as well as various other components of the electrophoretic display, are not depicted for clarity reasons. The electric charge present is not depicted but rather represented by a symbolic "V". The transition from uncompressed (FIG. 1A) to compressed (FIG. 1B) state will result in a reduction of the resistance between the source of applied charge "V" and the electrophoretic layer. Because of the decreased resistance, the electrophoretic layer 104 will experience a stronger electric field, which is sufficient to cause the electrophoretic layer 104 to change display state. In the instance where the first conductive layer has a resistance to compression (which is common), the display 100 can be incorporated into, for example, a button to provide both visual and haptic feedback to a user.

Figure 2A:
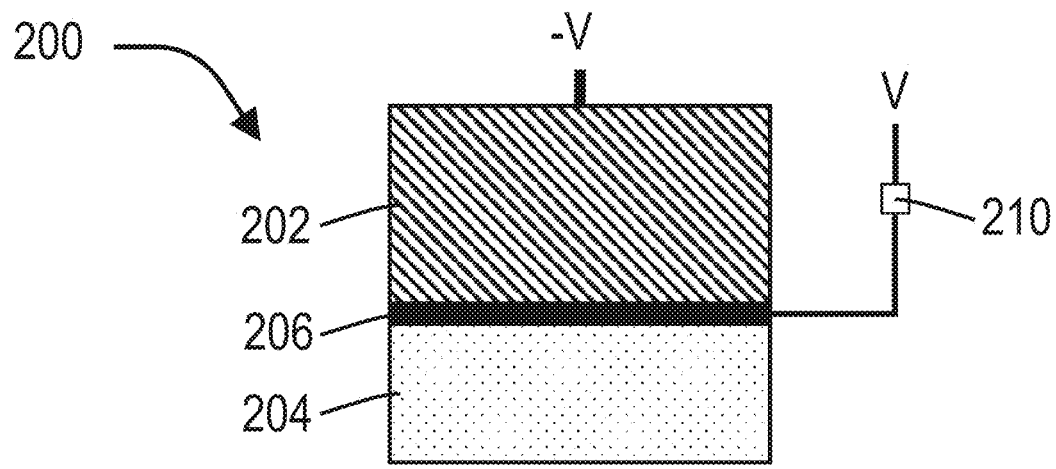
FIG. 2A is another exemplary illustration of a pressure-sensitive electrophoretic display construction with a conductive layer in an uncompressed state.
Figure 2B:
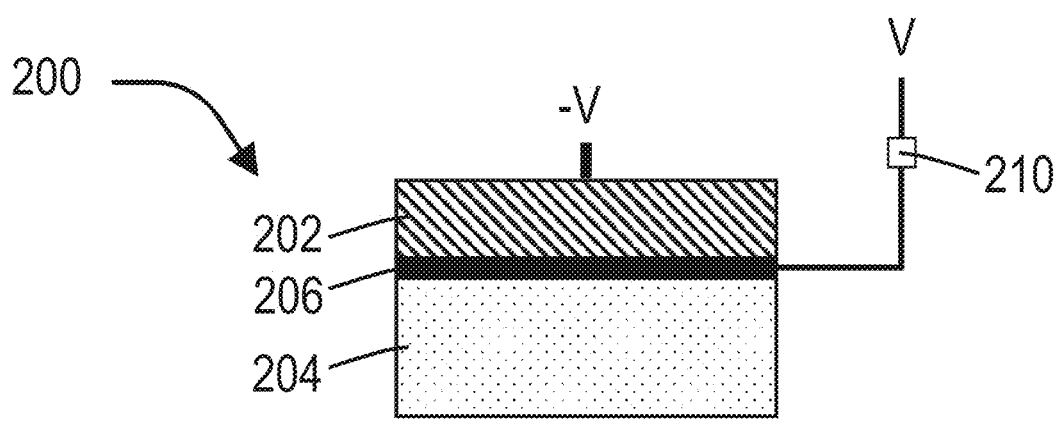
FIG. 2B is another exemplary illustration of a pressure-sensitive electrophoretic display construction with a conductive layer in a compressed state.

FIG. 2A depicts a second embodiment of a pressure-sensitive, electrophoretic display 200 with a first conductive layer 202 and an electrophoretic layer 204. Interposed between and electrically connected to these two layers is a first electrode layer 206. This first electrode layer is electrically connected to a fixed current limiting resistor 210. In this depiction, the first conductive layer and the electrophoretic layer can effectively be considered as being electrically connected in parallel. FIG. 2B depicts the same display 200 at a later time when the first conductive layer 202 has undergone compression. Such compression allows for sufficient current flow through the first conductive layer 202 to produce a change in state of the electrophoretic display 204. In this configuration, the magnitude of the applied pressure can cause the electric charge potential experienced by the electrophoretic layer 204 to increase or decrease. The change in state of the display, as well as various other components of the electrophoretic display 200, are not depicted for clarity reasons. The electric charge present is not depicted but rather represented by "V" and an additional lower "−V".

Figure 3A:
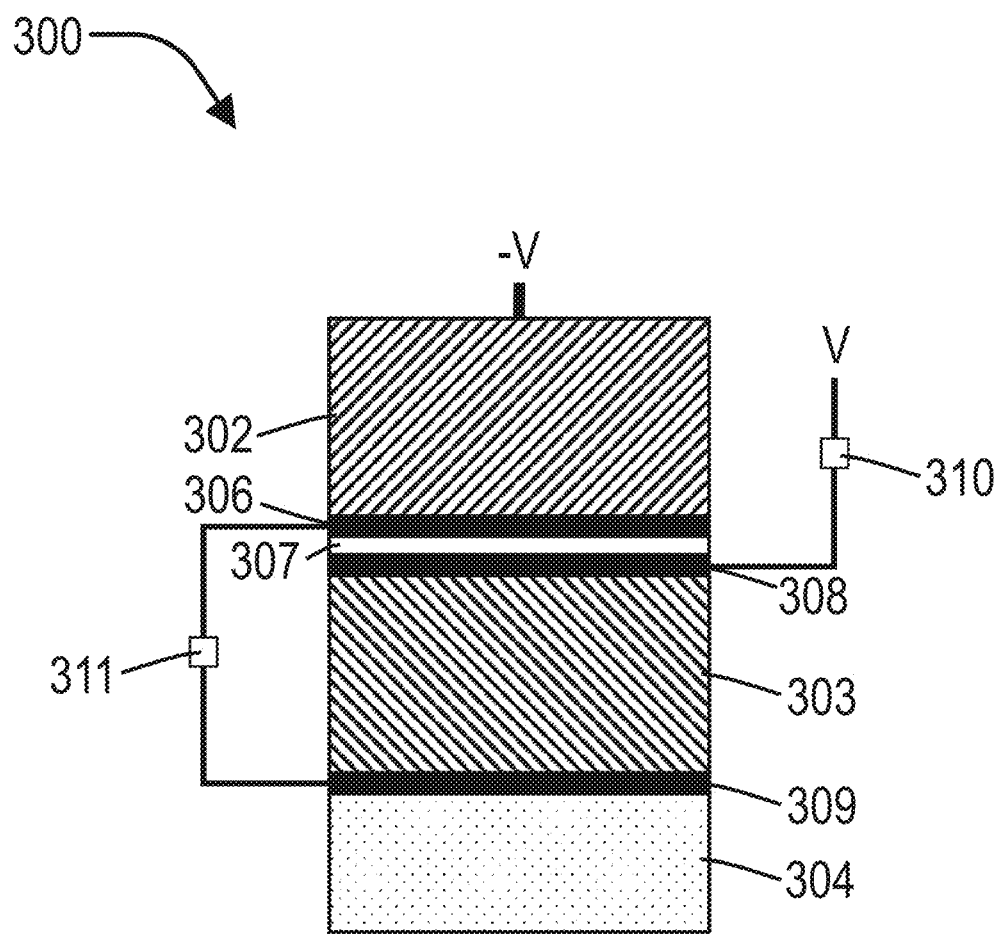
FIG. 3A is an exemplary illustration of a pressure-sensitive electrophoretic display construction with two conductive layers that are both in uncompressed states.

FIG. 3A depicts a third embodiment of a pressure-sensitive, electrophoretic display 300 with a first conductive layer 302, a second conductive layer 303, and an electrophoretic layer 304. Interposed between the first conductive layer 302 and the second conductive layer 303 is a first electrode layer 306 in contact and electrical communication with the first layer 302. A second electrode layer 308 is also interposed between the first conductive layer 302 and the second conductive layer 303 and in contact and electrical communication with the second conductive layer 303. An insulation layer 307 is positioned between the first electrode layer 306 and the second electrode layer 308. A third electrode 309 is interposed between the second conductive layer 303 and the electrophoretic layer 304 and is in contact and electrical communication with both. A first fixed current limiting resistor 310 is electrically connected to the second electrode layer 308. A second fixed current limiting resistor 311 is electrically connected to both the first electrode layer 306 and the third electrode layer 309. In this depiction, the first conductive layer 302 and the electrophoretic layer 304 can effectively be considered as being electrically connected in series. The second conductive layer 303 and the electrophoretic layer 304 can effectively be considered as being electrically connected in parallel. The electric charge present is not depicted but rather represented by "V" and an additional lower "−V".

Figure 3B:
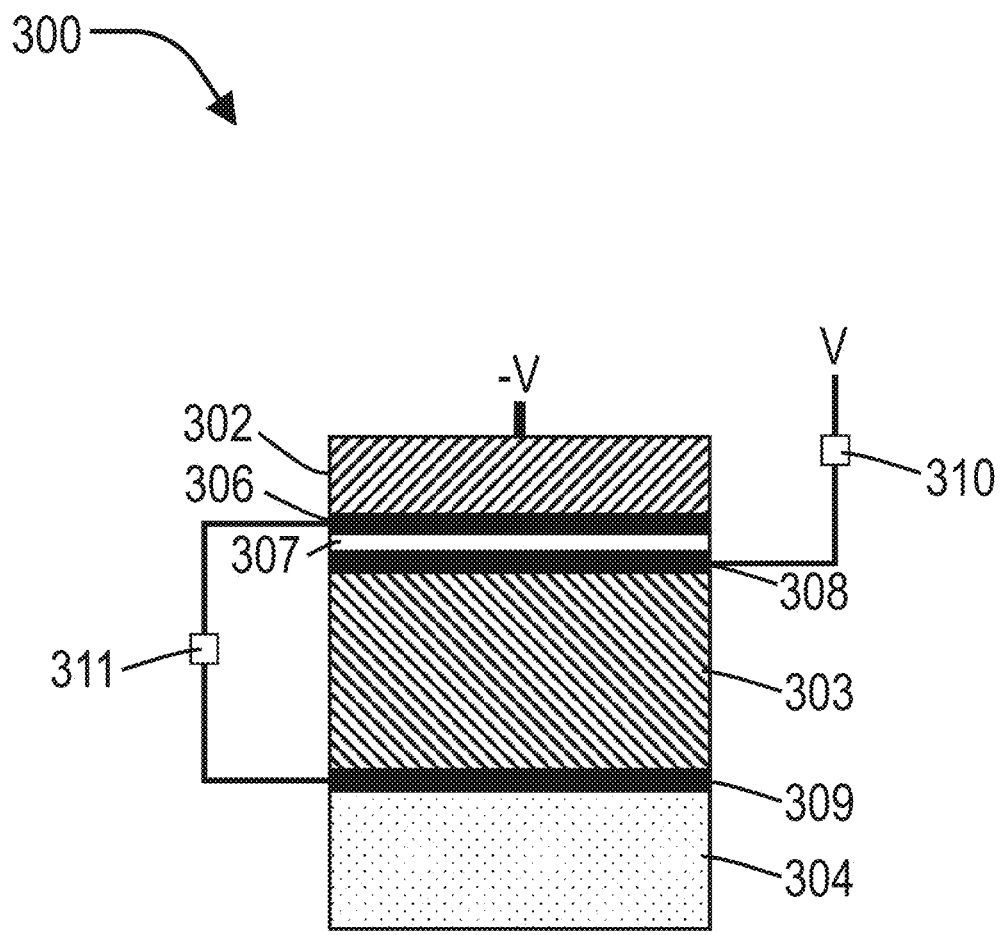
FIG. 3B is an exemplary illustration of a pressure-sensitive electrophoretic display construction with two conductive layers wherein the first conductive layer is in a compressed state while the second conductive layer is in an uncompressed state

FIG. 3B depicts the same display 300 at a later time when the first conductive layer 302 has undergone compression. Because the deformation in the first conductive layer 302 dominates that of the second conductive layer 303, the electric charge potential experienced by the electrophoretic layer 304 will be pulled towards "−V". In order to produce such an isolated compression in only one of the layers, the first conductive layer 302 may have a lower yield strength and/or stiffness than that of the second conductive layer 303. This difference in mechanical properties allows for applied pressures of low magnitude and/or duration to only compress the first conductive layer 302. A reduction in the applied pressure may allow the display 300 to return to the initial state depicted in FIG. 3A.

Figure 3C:
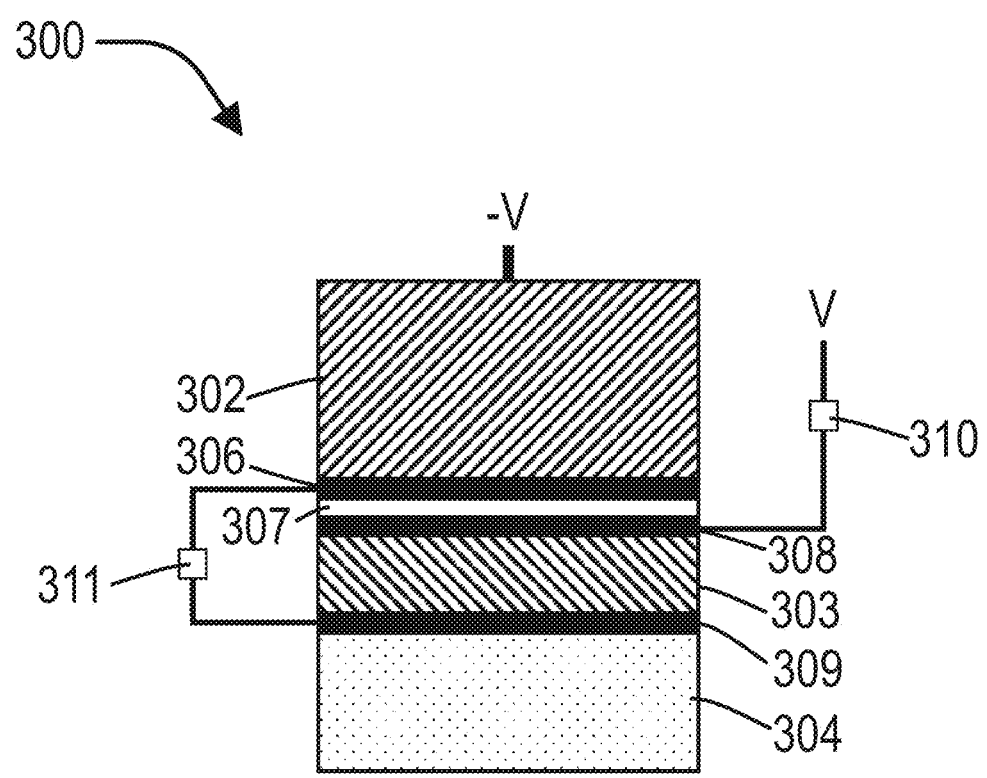
FIG. 3C is an exemplary illustration of a pressure-sensitive electrophoretic display construction with two conductive layers wherein the first conductive layer is in an uncompressed state while the second conductive layer is in a compressed state.

FIG. 3C again depicts the same display 300 at a later time when the second conductive layer 303 has undergone compression. Because the deformation in the second conductive layer 303 dominates that of the first conductive layer 302, the electric charge potential experienced by the electrophoretic layer 304 will be pulled towards "V". In order to produce such an isolated compression, the first conductive layer 302 may again have a higher yield strength and/or stiffness than that of the second conductive layer 303. This difference in mechanical properties allows for applied pressures of high magnitude and/or duration to compress the second conductive layer 303. A reduction in the applied pressure may allow the display 300 to return to the initial state depicted in FIG. 3A.

The material properties of the one or more conductive layers may be specifically tailored for the application of which the display is intended to be used. Various applications may necessitate varying sensitivity requirements that result from the magnitude, duration, and frequency of the applied pressure. The one or more conductive layers may be required to have a specific compressive strength, elasticity, stiffness, tensile strength, toughness, or yield strength properties. The one or more conductive layers may comprise piezoresistive materials.

Although FIG. 1A-3C depict the elements of the display as often contacting one another in a linear arrangement, one of skill in the art could apply these teachings to a variety of configurations, including arrangements wherein the one or more conductive layers are spatially separated from the electrophoretic imaging display. Additionally the electrophoretic layer may be designed to have a low image-stability, thereby making rapid state changes possible.

In another aspect, the present disclosure provides a pressure-sensitive, electrophoretic display. The display can comprise a first electrode layer and a second electrode layer, wherein the first electrode and the second electrode are configured to provide an electric potential difference. The display can also comprise an electrophoretic layer, wherein the electrophoretic layer is positioned between the first electrode and the second electrode and is configured to locally change state based on a pressure applied to the first electrode layer. In this embodiment, a compressible layer (not piezoresistive) separates the electrodes when the compressible layer is in an uncompressed state. The compressible layer may be a dielectric fluid layer, wherein the dielectric fluid layer comprises a dielectric fluid and is positioned between the first electrode and the electrophoretic material.

The electrophoretic layer may be further configured to locally change state back to an initial state. For example, if the initial change of state is from white to black in a local region of the display, this same local region may be turned from black to white by reversing the polarity of the electrodes. This local erasing could also result from a change in the magnitude and/or duration of the applied pressure. Such a change in the magnitude and/or duration of the applied pressure may also be accompanied by a change in the electrical potential difference from the first and second electrode layers. Additionally, the electrophoretic layer may globally change to a uniform state by changing the electric potential difference or applying a clearing waveform (an applied pulse). This global erasure can be used to effectively reset the display to a desired state. For example, the display may be globally changed to an all-white state from a state where both local white and black states are present on the display.

Figure 4A:
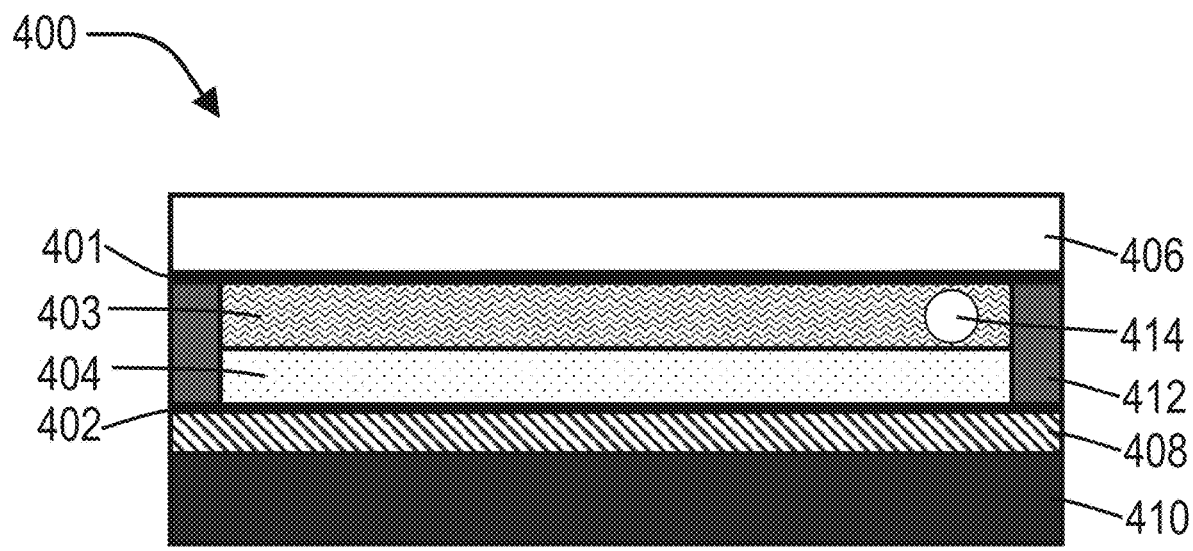
FIG. 4A is another exemplary illustration of a pressure-sensitive electrophoretic display in an initial state.

FIG. 4A depicts a pressure-sensitive, electrophoretic display 400 with a first electrode layer 401, a second electrode layer 402, and an electrophoretic layer 404 positioned between the first and second electrode layers. The electrophoretic layer 404 is typically encapsulated, for example in gelatin. Alternatively, the electrophoretic layer 404 may include a plurality of pre-fabricated microcells filled with electrophoretic materials. The electrophoretic layer may also include a polymer-dispersed electrophoretic medium, i.e., as described in the patents listed above. The electrode layers may be electrically connected to one or more electric charge sources and electronic components, which have not been depicted. The electrode layers may comprise indium tin oxide, PEDOT (poly(3,4-ethylenedioxythiophene)), or other polymers, such as polyethylene, that additionally include conductive matrix materials, such as metal flakes, whiskers, or fibrils, or fullerene-type compounds, such as carbon nanotubes, or graphene. Although only two electrodes are depicted, additional electrodes may be present within the display 400 and used to create distinct electric potential differences.

A compressible layer, which is a dielectric fluid layer 403, is located between the first electrode layer 401 and the electrophoretic layer 404. The dielectric fluid layer 403, the first electrode layer 401, and the second electrode layer 402 may be transparent or near transparent. The dielectric fluid may comprise dielectric solvents with low relative permittivity such as hydrocarbons, chlorinated hydrocarbons and fluorocarbons. The dielectric fluid may be selected from the group consisting of naphthas, $C_8$-$C_{11}$ isoalkanes, perfluorocarbons, paraffins, PTFE, polyethylene, silicone oils, or combinations thereof. The dielectric fluid may be doped with ionic charge carriers, such as salts or conductive monomers or polymers in order to change the relative permittivity to an optimal value. The dielectric fluid layer may have a relative permittivity between 2 and 6, for example, the dielectric fluid layer may have a relative permittivity between 2 and 4.

Also depicted in the display 400 of FIG. 4A is a flexible cover 406 that contacts the first (transparent) electrode 401. The flexible cover 406 may be transparent or near transparent in addition to having other display cover optical properties commonly known in the art. The display 400 may also comprise side walls 412 that may contact the dielectric fluid layer 403 and the electrophoretic layer 404. A substrate layer 408 may contact the second electrode layer 402 and a rear plate 410. The substrate 408 may be flexible and a rear plate 410 may be configured to provide structural support to the substrate 408 as well as the other components of the display 400. For example, the rear plate 410 may improve the overall stiffness of the display 400. Adhesive layers, which are not depicted, may be present between any of the component layers to assist in maintaining contact between the layers. For example, an electrically conductive adhesive layer may be positioned between the second electrode 402 and the electrophoretic imaging material 404.

One or more structural members 414 may be located within the dielectric fluid layer 403. The structural members 414 may be configured to maintain a uniform height of the dielectric fluid layer 403 by providing a restoring force or resistance to any applied pressure. The structural members 414 may selected from the group consisting of beads, threads, meshes, and combinations thereof. The structural members 404 may comprise a polymeric material.

Figure 4B:
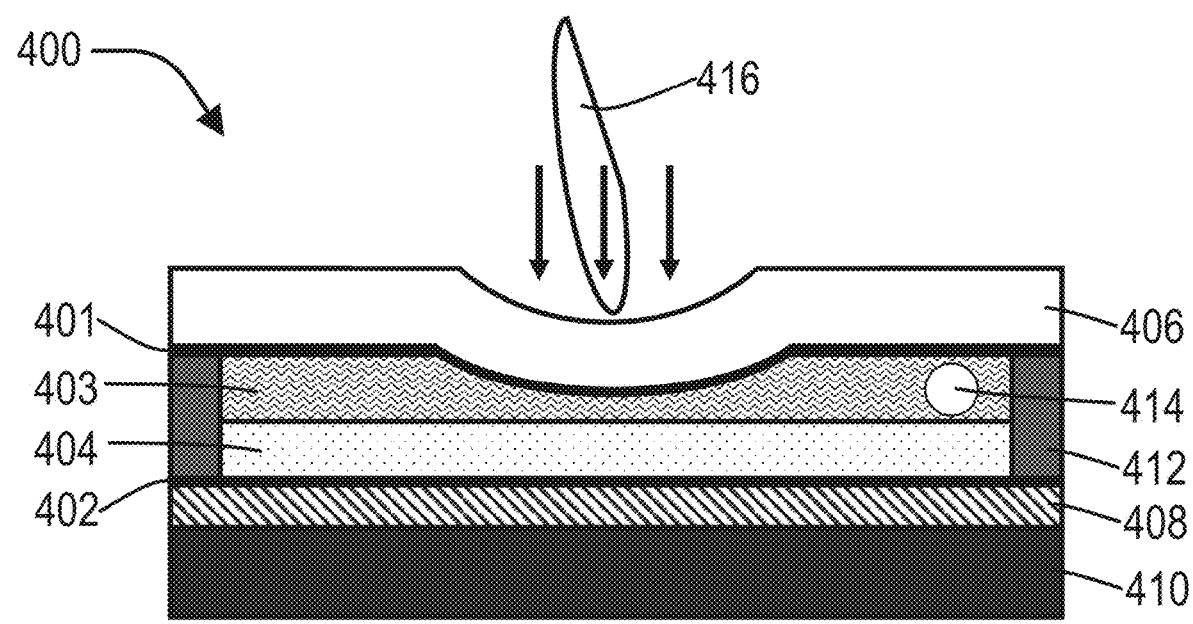
FIG. 4B illustrates the pressure-sensitive electrophoretic display of FIG. 4A after a compressive force has been applied to the display to move the electrodes above and below the electrophoretic layer closer together, thus producing a change in display state.

FIG. 4B again depicts the same display 400 at a later time when a pressure has been applied by an object 416. The object 416 may be a finger, stylus, or other item capable of creating a sufficient pressure to create a deformed region in the dielectric fluid layer 403. The flexible cover 406 and the first (transparent) electrode 401 bend to produce the deformed region in the dielectric fluid layer 403 as a result of the applied pressure from the object 416. This movement within the display 400 allows the first electrode layer 401 to move closer to the electrophoretic layer 404. Based on the electric charge supplied to first 401 and/or second 402 electrode layers, the electrophoretic layer 404 may locally change state. This change of state may be from an initial state to second state or from a second state back to an initial state. For example, the display 400 may be locally changed from white to black, which may be considered local writing. With a change in the electric charge supplied to the first 401 and/or second 402 electrode layers, the display 400 may then be locally changed from black to white, which may be considered local erasing. Additionally, the electrophoretic layer 404 may be globally changed to a uniform state by changing the magnitude of electric charge supplied to the first 401 and/or second 402 electrode layers. This change may be in the form of a pulse. For a global change, an applied pressure may not be necessary.

In one aspect, the present disclosure provides a pressure-sensitive, magnetoelectrophoretic display. The display can comprise a magnetic layer configured to produce a magnetic field and a magnetoelectrophoretic layer comprising an addressable ink medium that responds to both electric and magnetic fields and is configured to locally change state based on an applied pressure. The display can also comprise a deformable layer located between the magnetic layer and the electrophoretic layer, wherein applying a pressure to a location on the pressure-sensitive, electrophoretic display causes a displacement of at least a part of the deformable layer, thereby causing a change in the magnetic field experienced by a portion of the electrophoretic layer located at the location, thereby causing a local change of state in the electrophoretic layer.

The electrophoretic layer may be further configured to locally change state back to an initial state. For example, if the initial change of state is from white to black in a local region of the display, this same local region may be turned from black to white. This local erasing may result from a change in the magnitude and/or duration of the applied pressure. Such a change in the magnitude and/or duration of the applied pressure may also be accompanied by a change in the magnetic and/or direction of the magnetic field produced by the magnetic layer. Additionally, the display may globally change to a uniform state by applying a voltage pulse to the electrophoretic layer. This global erasure can be used to effectively reset the display to a desired state. For example, the display may be globally changed to an all-white state from a state where both local white and black states are present on the display.

Figure 5A:
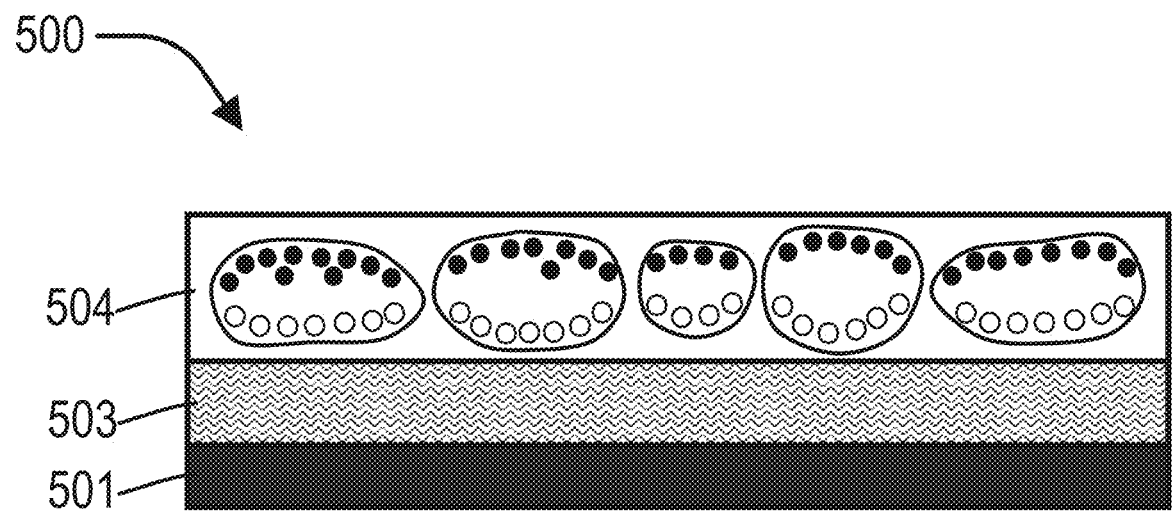
FIG. 5A is an exemplary illustration of a pressure-sensitive magnetoelectrophoretic display including a magnetic substrate and a compressible medium.

FIG. 5A depicts a pressure-sensitive, magnetoelectrophoretic display 500 with a magnetic layer 501, a magnetoelectrophoretic layer 504, and a deformable layer 503 located there between. Although, the magnetoelectrophoretic layer 504 as depicted is consistent with an encapsulated electrophoretic display configuration, other electrophoretic display configurations could be readily substituted. The magnetic layer 501 may comprise permanent magnets or a system for producing a magnetic field. For example, the magnetic layer 501 may comprise a polymer composite of permanent magnets or a sheet of magnetizable material with a coil of current-carrying wire wound around it. The deformable layer 503 may comprise a polymer, fluid, or some other material that can easily be compressed. The deformable layer 503 comprises a material selected from the group consisting of gel, a foam, or a viscous liquid. For example, the deformable layer may comprise a dielectric fluid, e.g., a silicone oil, a silicone gel, a polyurethane foam, a polyethylene foam, a polyester foam, a non-conductive grease, or a heavy oil. Additional components such as a flexible cover, back plate, electrode layers, one or more electric charge sources, and electronic components may also be present in the display.

Figure 5B:
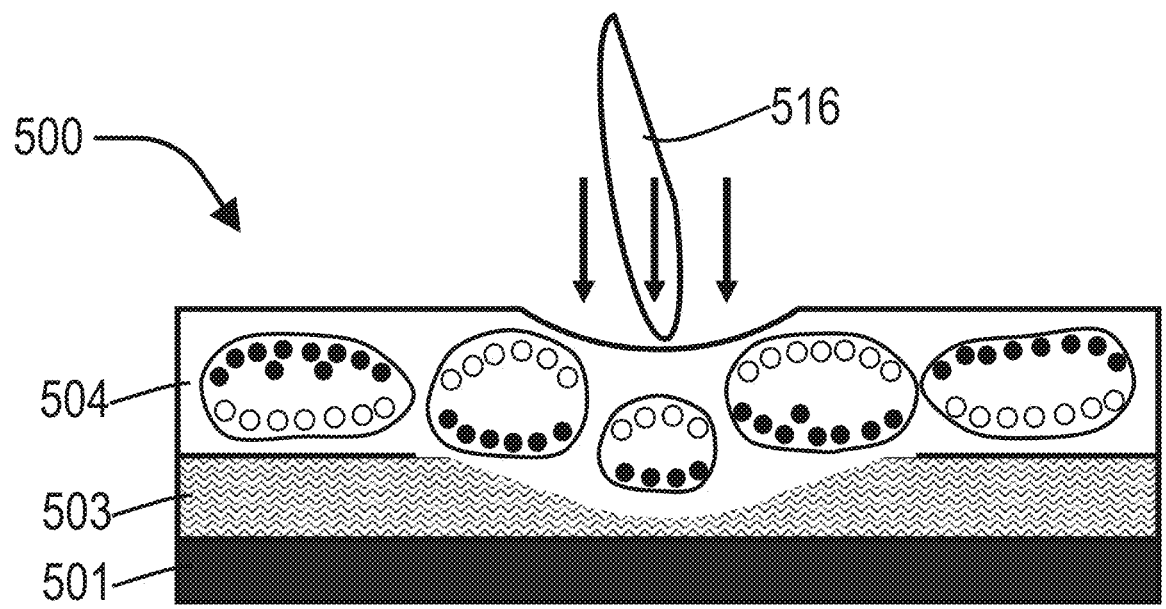
FIG. 5B shows the resulting state change when a compressive force is applied to the magnetoelectrophoretic display of FIG. 5A.

FIG. 5B again depicts the same display 500 at a later time when a pressure has been applied by an object 516. The object 516 may be a finger, stylus, or other item capable of creating a sufficient pressure to create a deformed region in the deformable layer 503. The magnetoelectrophoretic layer 504 may bend to produce the deformed region in the deformable layer 503 as a result of the applied pressure from the object 516. This movement within the display allows the magnetoelectrophoretic layer 504 to move closer to the magnetic layer 501. The local region that has a closer proximity to the magnetic layer 501 may experience increased magnetic forces and locally change state. Additionally, an electric pulse may be applied to the magnetoelectrophoretic layer 504. The change of state may be from an initial state to second state or from a second state back to an initial state. For example, the display 500 may be locally changed from white to black, which may be considered local writing. With a change in the magnetic field produced by the magnetic layer 501 and/or the application of an electric pulse to the magnetoelectrophoretic layer 504, the applied pressure may cause the display 500 to be locally changed from black to white, which may be considered local erasing. Additionally, the magnetoelectrophoretic layer 504 may be globally changed to a uniform state by changing the magnitude of the magnetic field or the magnitude of an applied electric charge to the magnetoelectrophoretic layer 504. For a global change, an applied pressure may not be necessary.

In another aspect, the present disclosure provides a method for using any of the pressure-sensitive displays described herein. The method can comprise a first step of creating a region of increased pressure by contacting the display, wherein the region of increased pressure produces a local change in a state of the display.

Figure 6:
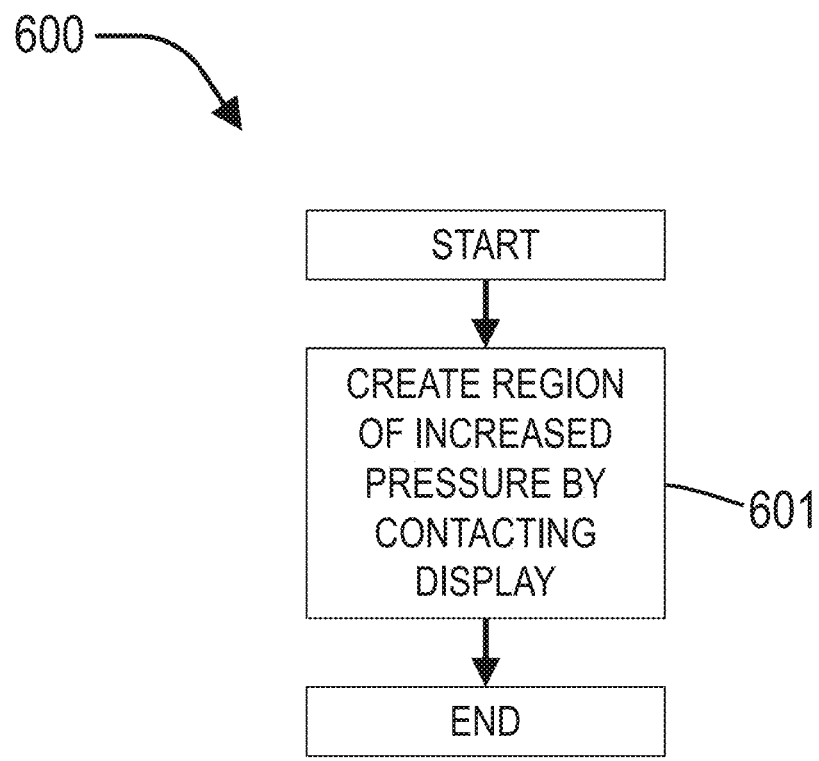
FIG. 6 is a method flowchart for using a pressure-sensitive electrophoretic display.

FIG. 6 depicts a method flowchart 700 for using a pressure-sensitive electrophoretic display. The method comprises a first step 601 of creating a region of increased pressure by contacting the display.

In the method, creating a region of increased pressure may comprise contacting the display with a finger, stylus, or other item capable of creating a sufficient pressure. The local change in a state of the display may be local erasure of a previous change in state of the display. The method may further comprise second step of producing a global change in a state of the display. Producing a global or local change may also comprise changing an electric field or magnetic field applied to an electrophoretic layer.

EXAMPLES

The following Examples are provided in order to demonstrate and further illustrate certain embodiments and aspects of the present disclosure and are not to be construed as limiting the scope of the disclosure.

Example 1

Figure 7:
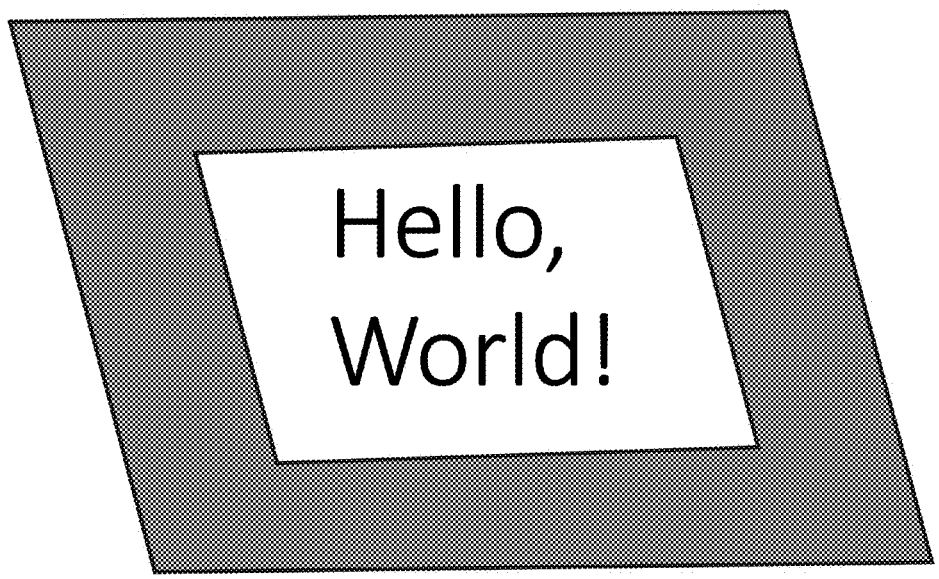
FIG. 7 is a photograph of an experimental pressure-sensitive, electrophoretic display after it has been addressed with a finger.

FIG. 7 is an image of an experimental pressure-sensitive, electrophoretic display constructed in accordance with the teachings of the present disclosure. The overall structure of the device of FIG. 7 is similar to FIGS. 4A and 4B. This experimental display uses a transparent electrode and a graphite electrode as well as a dielectric fluid layer to provide passive haptic feedback as well as local and global writing and erasing. The message "Hello, world!" was successfully written on the display with a finger. The region having the dielectric fluid (silicone oil, Dow-Corning) is the smaller, lighter-colored rectangle bordering the message. The larger rectangular substrate is actually "standard" E Ink front-plane laminate such as used construct various eReaders. The flexible cover is polyethylene and the transparent electrode layer is PET-ITO. The electrophoretic medium included white and black charged particles dispersed in naphtha, and the electrophoretic medium is encapsulated in gelatin-acacia capsules.

Thus, the present disclosure provides systems and methods relating to pressure-sensitive electrophoretic displays with passive haptic feedback.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

The invention claimed is:

1. An electrophoretic display comprising in order:
a first conductive layer, the first conductive layer having a pressure sensitive conductivity,
a first electrode layer,
an insulating layer,
a second electrode layer,
a second conductive layer, the second conductive layer having a pressure sensitive conductivity,
a third electrode layer, and
an electrophoretic layer,
the first electrode layer being in contact and electrical communication with the first conductive layer,
the second conductive layer being in contact and electrical communication with the second conductive layer,
the third electrode being in contact and electrical communication with the second conductive layer,
the third electrode being in contact and electrical communication with the electrophoretic layer,
the second electrode layer being electrically connected to a first fixed current limiting resistor,
the first electrode layer being electrically connected to a second fixed current limiting resistor,
the third electrode layer being electrically connected to the second fixed current limiting resistor,
wherein compression applied on the first conductive layer locally changes the state of the electrophoretic layer.

2. The electrophoretic display of claim 1, wherein the first conductive layer comprises a piezoresistive material.

3. The electrophoretic display of claim 2, wherein the piezoresistive material is doped germanium.

4. The electrophoretic display of claim 2, wherein the piezoresistive material is a polymer with oriented conductive particles.

5. The electrophoretic display of claim 4, wherein the piezoresistive material polymer is polyethylene or polyester and the conductive particles comprise carbon nanotubes or metal whiskers.

6. The electrophoretic display of claim 1, wherein applying a first pressure on the first conductive layer does not compress the second conductive layer, and wherein applying a second pressure on the first conductive layer compresses the first conductive layer and the second conductive layer, wherein the second pressure is larger than the first pressure.

7. The electrophoretic display of claim 1, wherein applying a pressure on the first conductive layer over a first duration does not compress the second conductive layer, and wherein applying a pressure on the first conductive layer over a second duration compresses the first conductive layer and the second conductive layer, wherein the second duration is longer than the first duration.

8. The electrophoretic display of claim 6, wherein the first conductive layer has lower yield strength than that of the second conductive layer.

9. The electrophoretic display of claim 6, wherein the first conductive layer has lower stiffness than that of the second conductive layer.

10. The electrophoretic display of claim 7, wherein the first conductive layer has lower yield strength than that of the second conductive layer.

11. The electrophoretic display of claim 6, wherein, application of the second pressure on the first conductive layer locally changes the state of the electrophoretic layer from a first state to a second state, and wherein, when the electrophoretic layer is locally at the second state, application of the first pressure on the first conductive layer locally changes the electrophoretic layer from the second state to the first state.

12. The electrophoretic display of claim 7, wherein, application of a pressure on the first conductive layer over the second duration locally changes the state of the electrophoretic layer from a first state to a second state, and wherein, when the electrophoretic layer is locally at the second state, application of a pressure on the first conductive layer over the first duration locally changes the electrophoretic layer from the second state to the first state.

* * * * *